United States Patent [19]

Newman

[11] 4,443,752

[45] Apr. 17, 1984

[54] SOLID STATE BATTERY CHARGER

[75] Inventor: William A. Newman, Salt Lake City, Utah

[73] Assignee: Utah Research & Development Co., Inc., Salt Lake City, Utah

[21] Appl. No.: 412,955

[22] Filed: Aug. 30, 1982

[51] Int. Cl.³ .............................................. H02J 7/04
[52] U.S. Cl. ...................................... 320/22; 320/36; 320/40; 320/43
[58] Field of Search ........................ 320/21, 22, 23, 24, 320/35, 36, 37, 38, 39, 40, 43

[56] References Cited

U.S. PATENT DOCUMENTS 4,016,473  4/1977  Newman ........................... 320/21 X
4,061,956  12/1977  Brown et al. ......................... 320/22
4,384,321  5/1983  Rippel ................................ 320/21 X Primary Examiner—William M. Shoop
Attorney, Agent, or Firm—Trask & Britt

[57] ABSTRACT

A battery charger, particularly suitable for use with aircraft, receives power from a variable source of direct current power. The received power voltage is boosted to a level no lower than a preselected level above battery voltage and regulated so that a constant charging current is supplied to a battery under charge in each of several charging modes. The charger has controls which are responsive to various battery parameters and circuitry to initiate various safety signals. The constant charging current is supplied by a buck regulator which has MOSFET transistors connected to form a current regulating loop.

10 Claims, 7 Drawing Figures

SOLID STATE BATTERY CHARGER

BACKGROUND OF THE INVENTION

1. Field

This invention relates to battery chargers. More particularly, this invention provides for a solid state battery charger which receives power from a variable voltage direct current power source and supplies a multi-mode charging program having a constant current in selected mode related to the state of charge of the battery under charge and which is particularly suitable for use with vehicles and especially aircraft.

2. State of the Art

In many applications batteries are used as a temporary or emergency source of power. For example, in certain kinds of vehicles (e.g., aircraft), batteries act as a source of power for starting engines and as an emergency source of power in the event the generator typically associated with the engines of the vehicle fails. For such applications, it is important to return the battery to and maintain it in a fully charge condition after use. However, it is well known that charging a battery to and maintaining it in a fully charged condition is a multifaceted problem involving many factors. For example, battery type, battery age and useful life, available charging power, physical environment, and battery capacity are just some of the factors to be considered in selecting not only the battery to be used but also the battery charger and charging program to optimally charge and recharge the battery.

In some applications, it is essential that the battery be rapidly, safely and fully charged from whatever level of discharge of the battery, including deep discharge. Further, it may also be important that charging be done automatically and reliably. This is particularly important for vehicles in which the battery is required to reliably deliver starting power and/or act as a reliable source of emergency power because of the nature of the vehicle's environment or use. Such vehicles include aircraft, military tanks, power boats, surface effect watercraft, certain recreational (e.g., off-the-road) vehicles and the like. In other applications, the type of battery used suggests that the battery be properly and efficiently charged to prolong battery life and to improve battery effectiveness and performance. For example, heavy equipment (i.e., bulldozers, graders, etc.) vehicles and other diesel engine equipment may use expensive high capacity batteries which should be optimally charged to prolong their life and effectiveness.

Battery charging for aircraft and especially high altitude aircraft is further complicated by additional platform and environmental factors. For example, as altitude increases, less air is available for cooling and gasing during charge can be more significant. The cold temperatures during winter months or at high altitudes (e.g., above about 30,000 feet) can have an adverse effect on the battery charger and the battery. In aircraft it is frequently desirable to minimize weight. In turn, the power source typically associated with the engine (e.g., generator/alternator) may not have extensive voltage regulation to eliminate weight. However, typical battery chargers are not readily adaptable to or efficient when used with variable voltage power supplies.

U.S. Pat. No. 4,061,956, issued Dec. 6, 1977, discloses an electronic battery charger suitable for use with aircraft. However, the charger therein disclosed is not optimally efficient (about 80%) and generates enough heat to be less than optimum for use especially with aircraft. Further, the charger disclosed in U.S. Pat. No. 4,061,956 is suited for use with voltages that do not exceed about 29 volts and is not adaptable for use with a power supply that varies widely in voltage (e.g., from about 26 volts to about 35 volts DC).

A high efficient charger that is lightweight, reliable and suitable for use with a widely varying source voltage is not available.

BRIEF DESCRIPTION OF THE DRAWINGS

In the drawings, which illustrates the best mode presently contemplated for carrying out the invention.

DESCRIPTION OF THE ILLUSTRATED EMBODIMENT

Figure 1A:
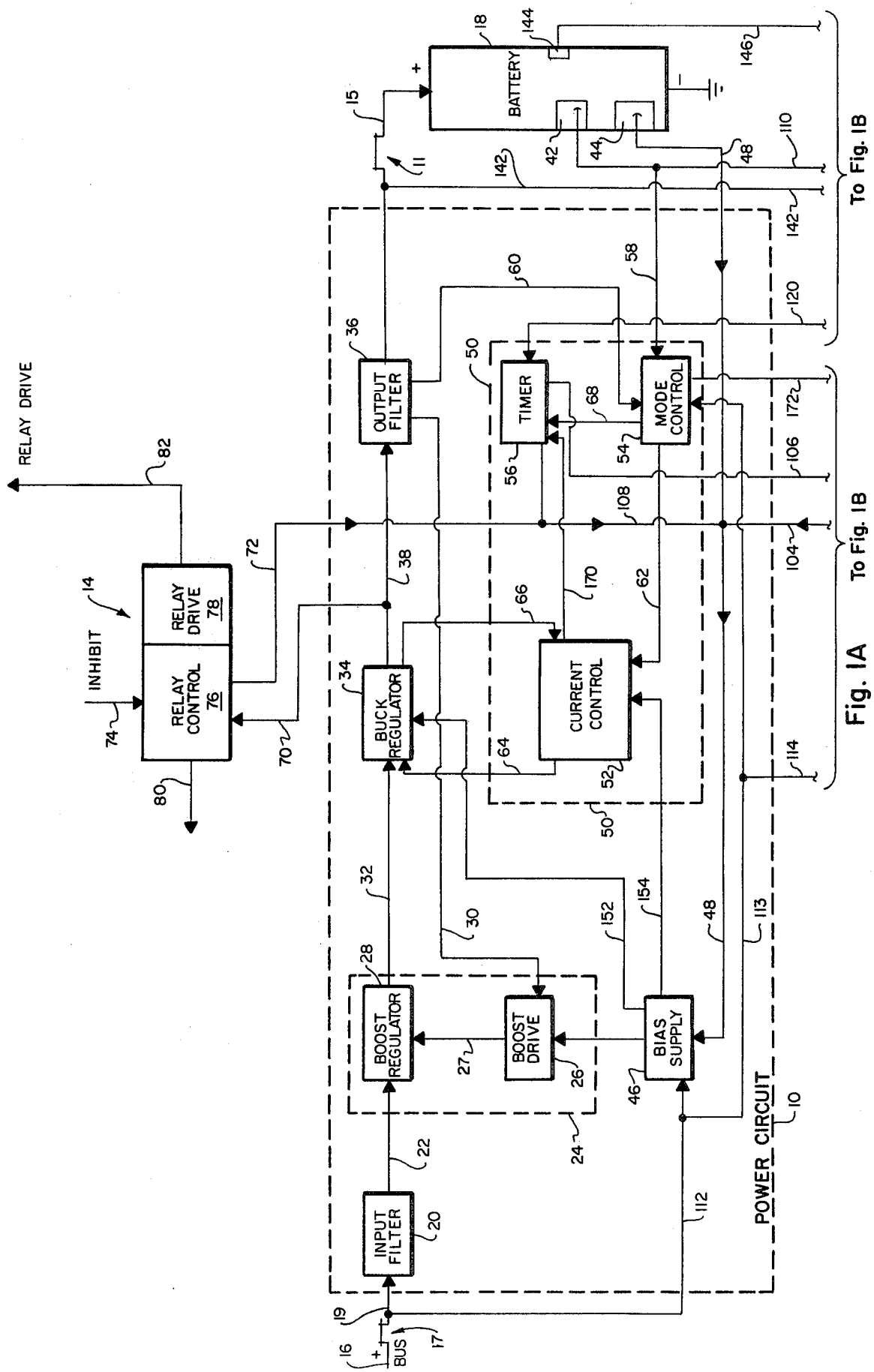
FIGS. 1A and 1B together are a simplified block diagram of a battery charger of the invention.
Figure 1B:
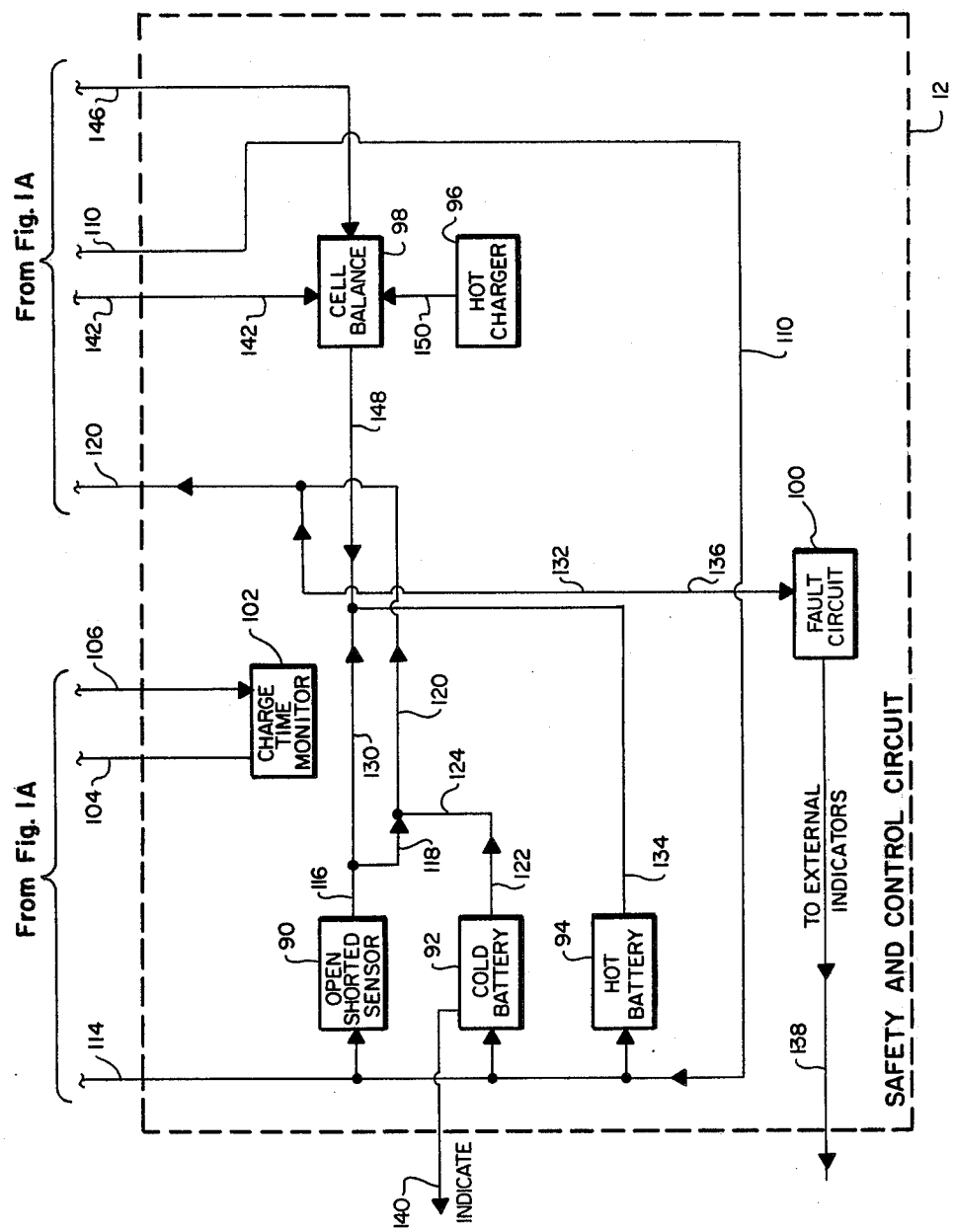

The simplified block diagram of FIGS. 1A and 1B depict battery charger of the instant invention. The charger includes a Power Circuit 10, a Safety and Control Circuit 12 and an optional Relay Control and Drive Circuit 14.

The Power Circuit 10 receives power from an external source which is typically the direct current (d.c.) bus of the platform of the charger. For this embodiment, the voltage of the bus varies widely in normal conditions from as high as 35 volts d.c. to as low as 25 volts d.c. The Power Circuit 10 is removably conductively connected to the bus 16 by any suitable connector 17. The Power Circuit 10 is also removably conductively connected to the battery 18 to be charged via connector 11 and conductor 15. In this embodiment, the battery 18 is a 24 volt nickel cadmium battery typically used with aircraft.

The Power Circuit 10 has an input filter 20 which is connected to receive power from the bus 16 and the connector 17 via conductor 19. The filter 20 smoothes input power and acts to minimize high frequency transients and noise as well as electromagnetic interference (EMI) reflected from the charger back on the bus 16 and from the bus 16 into the charger. The output of filter 20 is connected by conductor 22 to boost means 24.

The boost means 24 is comprised of a boost drive circuit 26 connected by conductor 27 to the boost regulator 28. The boost means 24 is also conductively connected by conductor 30 to the output of the Power Drive Circuit 10 to sense the voltage of the battery 18. The boost means 24 receives the input power and boosts its voltage to be at a preselected level above the level of sensed battery voltage. In this embodiment the boost means 24 boosts the voltage of the input power to be at a level about three volts above the sensed battery voltage. If the voltage of the input power is three volts or higher above battery voltage, the boost means 24 is inoperative.

The output of the boost means 24 is supplied via conductor 32 to a buck regulator 34 circuit which develops a constant current output in each charging mode. The constant current output of the buck regulator 34 is supplied to the output filter 36 via conductor 38. The output filter 36 smoothes the output power supplied to the battery 18 and acts to minimize EMI reflected through the battery 18 onto the bus 16 and also back into the charger.

The charger also includes sensing means to sense selected variable parameters of the battery 18 under charge. The sensing means includes conductors connected to sense battery voltage such as conductor 30. The sensing means also includes a temperature detector 42 positioned proximate the battery 18 to generate signals reflective of the battery temperature. The sensing means also includes a thermal switch 44 which operates to deactivate the Power Circuit 10 by supplying a signal to a bias supply circuit 46 via conductor 48, as more fully discussed hereinafter.

The Power Circuit 10 also includes a current and mode regulating circuit 50 which develops and supplies mode control and current control signals. The current-mode regulating circuit 50 includes a current control circuit 52, a mode control circuit 54 and a timer or topping control circuit 56. The mode control circuit 54 is conductively connected by conductor 58 to the temperature sensor 42 of the sensing means to receive a temperature reflective signal. The mode control 54 is also conductively connected to the output of the buck regulator 34 at the output filter 36 via conductor 60 in order to sense battery voltage. The mode control circuit 54 in turn senses the state of charge or discharge of the battery 18 and supplies an appropriate mode control signal via conductor 62 to the current control circuit 52.

The current control circuit 52 supplies bias signals via conductor 64 to the buck regulator 34. The current control 52 also senses the output of the buck regulator 34 via conductor 66.

The mode control 54 also supplies a mode signal via conductor 68 to the timer or topping control 56. The timer 56 is a capacitive integrator which monitors how long the charger was in a particular mode and in this embodiment the main mode, as more fully discussed hereinafter. The timer 56 thereafter supplies a signal to ensure that the battery charger operates in a topping mode for a preselected percentage of time that the charger was in a main mode, as more fully discussed hereinafter.

FIG. 1A illustrates relay control 76 and relay drive 78 circuits. The relay control and relay drive circuit is conductively connected by conductor 70 to receive power from the output from the buck regulator 34 and deliver signals to the timer 56 via conductor 72. The relay control 76 can also receive an inhibit signal or stop charging signal via conductor 74 from an external source. The relay control 76 is conductively connected with the relay drive circuit 78 which in turn supplies relay drive signals via conductor 80 to components external to the battery charger and indication signals via 82.

FIG. 1B illustrates the safety and control circuit 12 which includes an open or shorted sensor detector 90, cold battery detector 92 and hot battery detector 94. The safety control circuit 12 also includes a hot charger detector 96, a cell balance detector 98, a fault circuit 100 and a charge time monitor 102.

The charger time monitor 102 is conductively connected via conductor 104 to receive a signal from the timer 56 and supplies an output signal to the timer 56 via conductor 106. The charge time monitor 102 is an integrator that monitors the time the charger is supplying current to the battery 18 from the moment the charger begins to supply the current. Should the charging time exceed a preselected maximum (e.g., 90 minutes), the charger is turned off because the signal from the charge time monitor 104 to the timer 56 via conductor 106 disables the timer which in turn supplies a disable signal to the bias supply 46 via conductor 108 and 48.

The Control Circuit 12 receives temperature signal from the temperature sensor 42 via conductor 110. The temperature signal is supplied to the hot battery detector 94, the cold battery detector 92 and the open-shorted sensor detector 90. The open-shorted sensor detector 90, cold battery detector 92 and hot battery detector 94 also receive power from the bus via conductors 112 and 114. The open-shorted sensor detector 90 monitors the signal from the temperature detector 42 and supplies a safety signal via conductor 116, 118 and 120 to the timer 56 in the event the detector signal is indicative of an open or shorted detector 42. The cold battery detector 92 monitors the temperature detector 42 and supplies a safety signal if the sensed temperature of the battery falls below a preselected minimum temperature to safely charge the battery 18. The cold battery safety signal is supplied to the timer 56 via conductor 122, 124 and 120.

The hot battery detector 94 similarly monitors the temperature detector 42 and supplies a safety signal to stop the charger from operating in the event that the battery temperature exceeds a preselected maximum (e.g., 150° F.). The hot battery detector 94 safety signal is supplied to the timer 56 via conductor 126, 128, 124 and 120. The signals from the cold battery detector 92, the open-shorted sensor detector 90 and the hot battery detector 94 are each supplied to the fault circuit 100 via conductor 130, 132, 134 and 136, as shown. The fault circuit 100 in turn supplies a signal to external indicators via conductor 138 and the timer 56 via conductor 120. The cold battery detector 92 supplies a signal to a separate external indicator signal via conductor 140.

The Safety Control Circuit 12 also includes a cell balance detector 98 which is conductively connected to receive a battery voltage signal from the output conductor 15 via conductor 142. The cell balance detector 98 receives another voltage signal from the mid-point 144 which is a separate tap the electrical mid-point of the individual cells of the battery 18. The voltage signal from the tap 144 is supplied to the cell balance detector 98 via conductor 146. The cell balance detector 98 determines whether or not there is electrical imbalance in the battery during charging. If electrical imbalance occurs, it supplies a safety signal via conductor 148, 130, 118 and 120 to the timer 56. It also supplies a fault indication signal via conductor 148, 132 and 136 to the fault circuit 100.

The hot charger circuit 96 is also included in the Safety and Control Circuit 12 and includes its own resistance temperature detector to sense the temperature of the battery charger itself. If a hot charger condition is detected by the hot charger circuit 96, a safety signal is supplied to stop the battery charger via conductor 150 through the cell balance detector 98 output and via conductor 148, the same as the safety signal from the cell balance detector 98.

As can be seen, the safety signals supplied to the timer 56 are in turn supplied via conductor 108 and 48 to disable the bias supply 46 and in turn the charger. The bias supply 46 receives power from the bus 16 and in turn distributes power to the various components of the Power Circuit 10 and the Safety Control Circuit 12. This power is supplied for example to the buck regulator 34 via conductor 152, to the current control circuit 52 via conductor 154 and to other components as shown in the detailed circuit diagrams of FIGS. 2–6.

Figure 2:
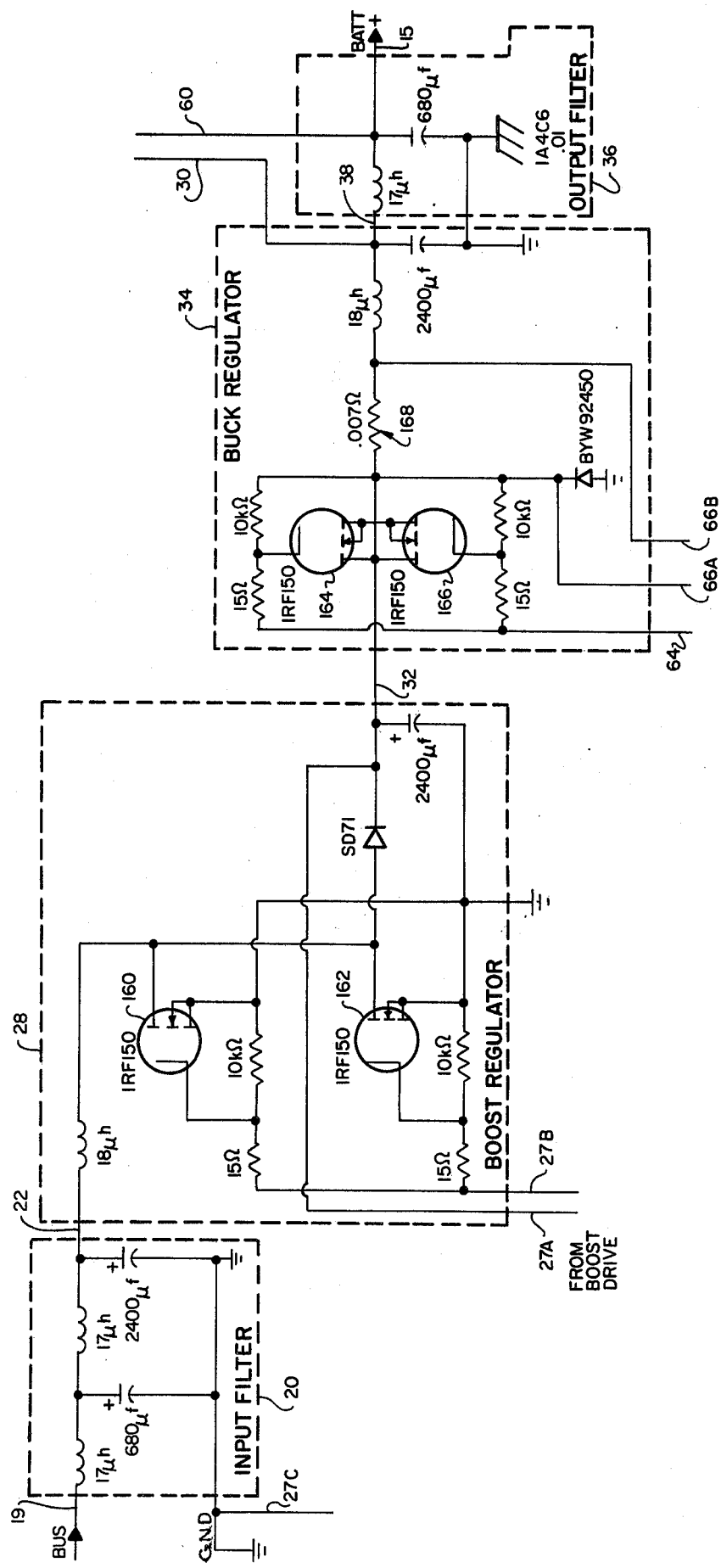
FIGS. 2, 3 and 4 illustrate practical circuitry of a power circuit of a battery charger of the invention.

Referring now to FIG. 2, practical circuitry for certain components of the Power Circuit 10 are illustrated in detail. In particular, the input filter 20, the boost regulator 28, the buck regulator 34 and the output filter 36 are shown. The input filter 20 is shown as an inductive capacitance impedance network. The boost regulator 28 is shown as a pulse with modulator control which operates at about 50 kilohertz. The boost regulator 28 uses two power MOSFET transistors 160 and 162 which turns off as soon as the voltage supplied to the buck regulator exceeds about 3 volts. Use of the power MOSFET 160, 162 allows for high operating frequency and high efficiency with small magnetics. The boost regulator 28 boosts the input voltage until its output is approximately 3 volts above the sensed battery voltage which is sensed by the boost drive circuit 26 via conductor 30, as shown in FIG. 1A and in greater detail in FIG. 3.

FIG. 2 also illustrates a practical circuit for a buck regulator 34 of the instant invention. The buck regulator 34, as here shown, is a current regulating loop employing two power MOSFET transistors 164, 166. A bias voltage is supplied via conductor 64 from the current control 52. With the bias voltage present, the transistors 164 and 166 run in a closed loop fashion to provide a constant output current. The output current is sensed across resistor 168 via conductor 66A and 66B by the current control 52. The output of the buck regulator 34 is shown passing through the output filter 60 via conductor 38 to the battery 18 (FIG. 1A) via conductor 15. It should be noted that the output of the buck regulator 34 is in fact different depending on the bias voltage supplied to the buck regulator 34. In other words, the bias voltage supplied from the current control 52 in fact controls charging mode and the output current of the buck regulator 54. In the illustrated circuits, three modes are provided: off, main charging mode (30 amps) and the topping mode (10 amps).

Figure 3:
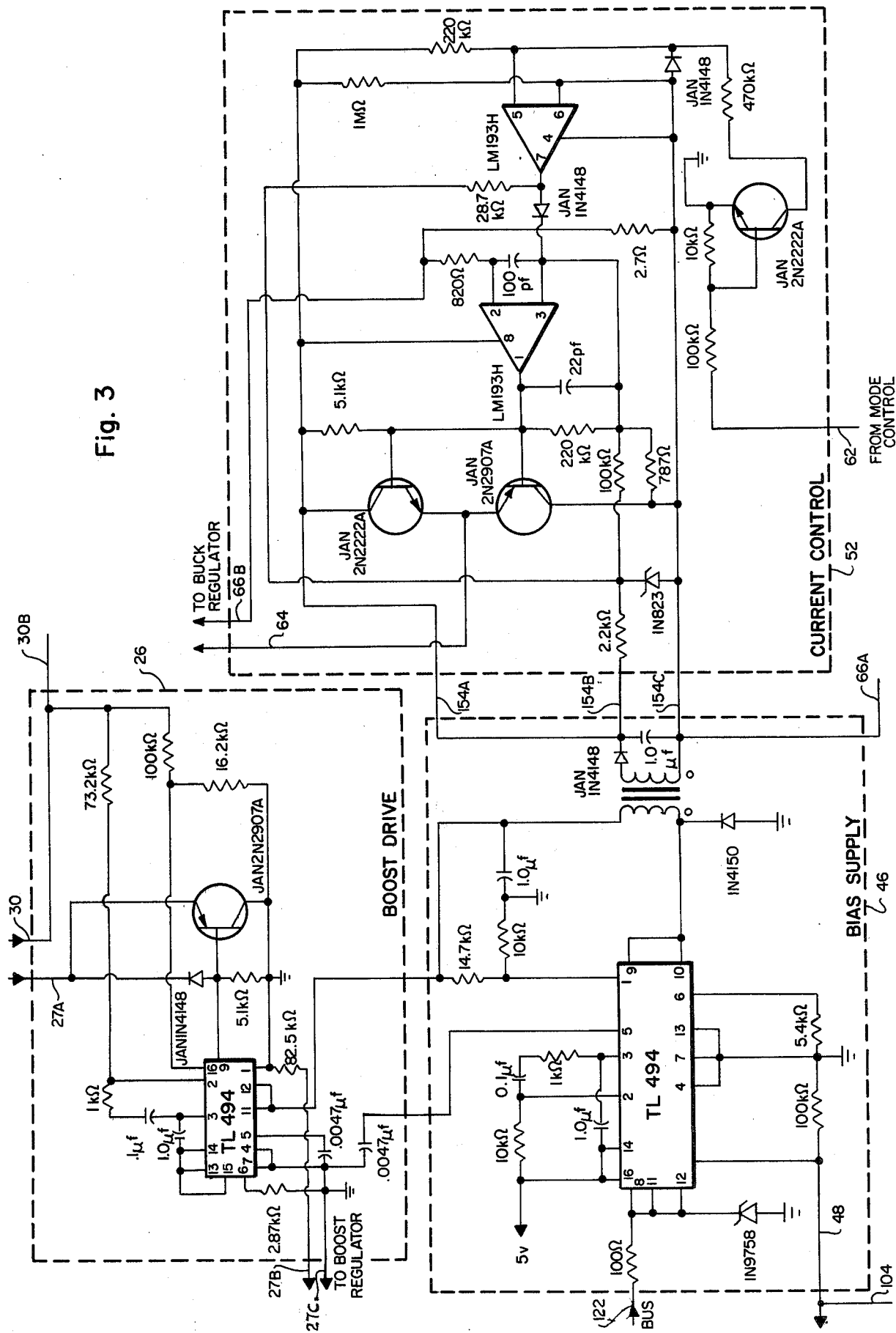
Figure 4:
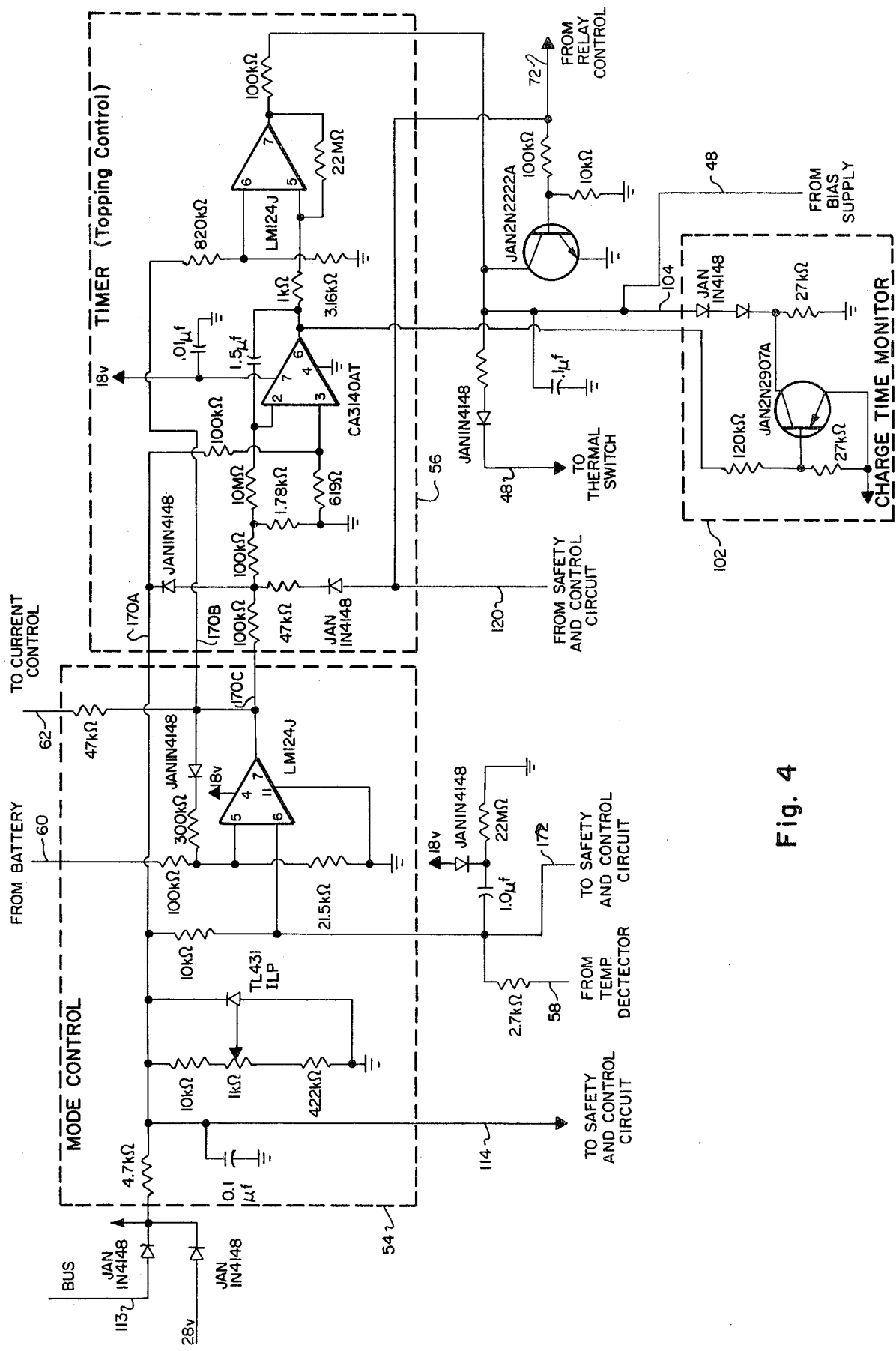

Referring now to FIG. 3, additional components of the Power Circuit 10 are illustrated in practical detail. In particular, the boost drive circuit 26, the current control 62 and the bias supply 46 are shown. FIG. 4 also illustrates additional practical circuits of the Power Circuit 10. In particular, FIG. 4 depicts practical circuitry for the mode control 54 and the timer 56. The charge time monitor 102 of the Safety and Control Circuit 12 is also shown in FIG. 4.

Figure 5:
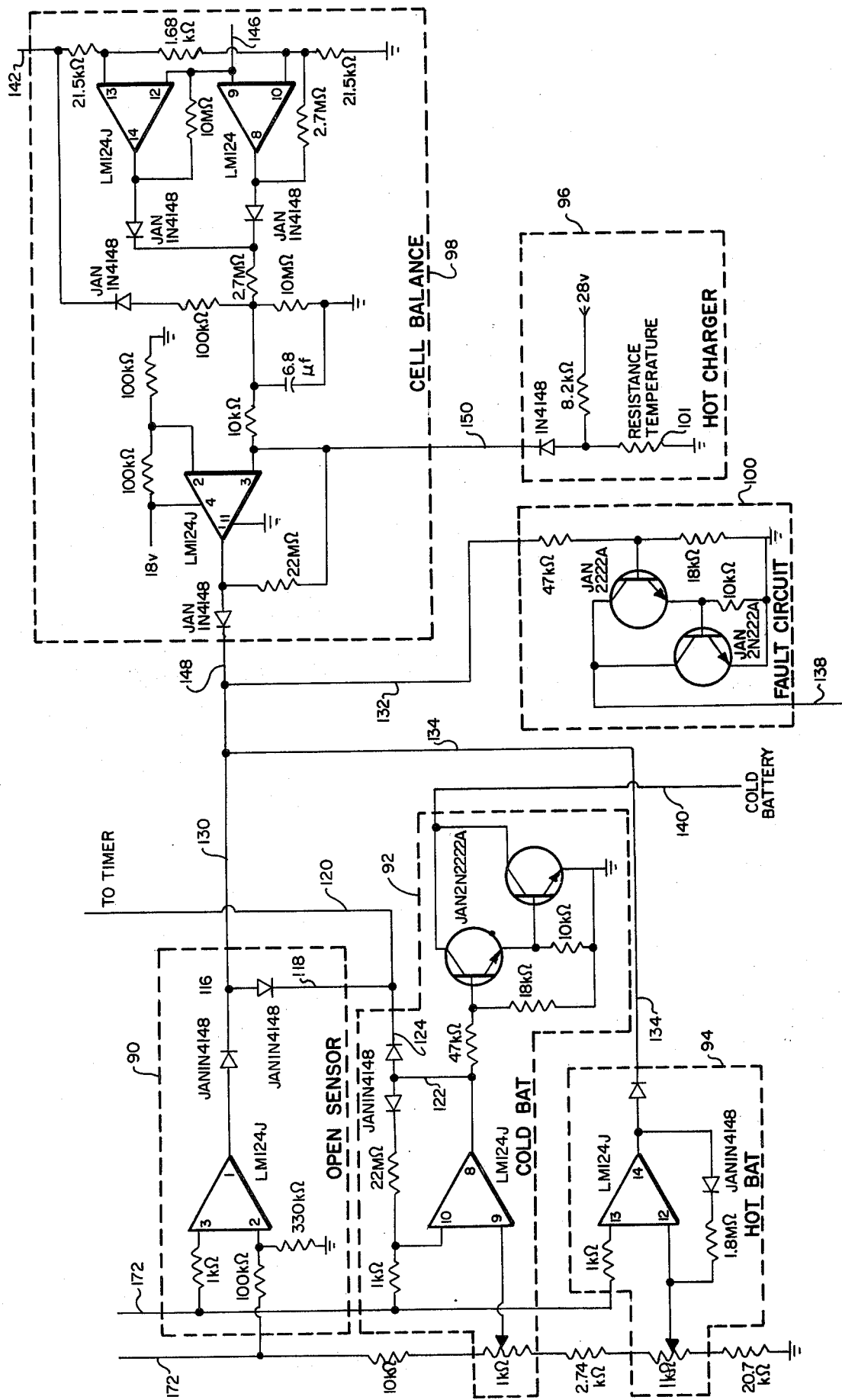
FIG. 5 illustrates practical circuitry of a safety and control circuit of a battery charger of the invention.

Practical circuitry for various components of the Safety Control Circuit 12 are further shown in FIG. 5. In particular, the open or shorted sensor detector 90, the cold battery detector 92 and the hot battery detector 94 are illustrated. Also shown is the fault circuit 100, the cell balance circuit 98 and the hot charger detector 96. The current passing to ground through resistor 101 causes a hot charger temperature safety signal (battery charger shut down) to be passed through the cell balance detector 98.

Referring again to FIG. 4, it should be noted that the mode control circuit 54 monitors the battery voltage and temperature to determine when the charger should be in the main charging mode (e.g., 30 amps), when it should be in a topping mode (e.g., 10 amps), and when it should be off. The circuit 54 receives a low voltage from an external source to inhibit the charger in the event charger operation is desired to be stopped.

Referring to FIG. 3, the current control circuit 52 receives a signal from the mode control circuit 54 to determine when the buck regulator 34 should be in a main charging mode and when it should be in a topping mode. In the main mode, the buck regulator 34 will supply a constant 30 amp charging signal to the battery 18 under charge. In the topping mode, it supplies a 10 amp constant current signal for approximately one-half the time the main signal was supplied. The current control 52 also receives a signal from the timer 56 to shut the buck regulator off 34 and stop charging. In the instant embodiment, this is effected by sending a disable signal to the bias supply circuit 46 of the Power Circuit 10. The disable signal stops the bias supply 46 from supplying necessary supply voltages throughout the battery charger which in turn causes the buck regulator 34 to turn off. It should be recognized that the buck regulator 34, in combination with the current control 52, mode control 54 and timer 56, is here acting as a switching device to switch between modes and thus eliminate the need for power switching circuitry.

Referring to FIG. 5, it should be noted that the cell balance detector 98 is connected to receive the battery voltage and also a voltage signal from the mid-point of the battery. The battery under charge 18 battery tap 144 is positioned such that the cell balance detector monitors and compares the upper ten cells of the battery with the second or lower ten cells of the battery. When the voltage is not in the right ratio or equivalent to one cell shorted, the detector 98 supplies a delayed signal to shut the battery charger off and give a battery faulty indication. The time delay allows the charger to be in the main charging mode for approximately 20 seconds to clear temporarily reversed or shortage cells which may exist because of deep discharge so the charger is not immediately shut off when the charger is first turned on.

Figure 6:
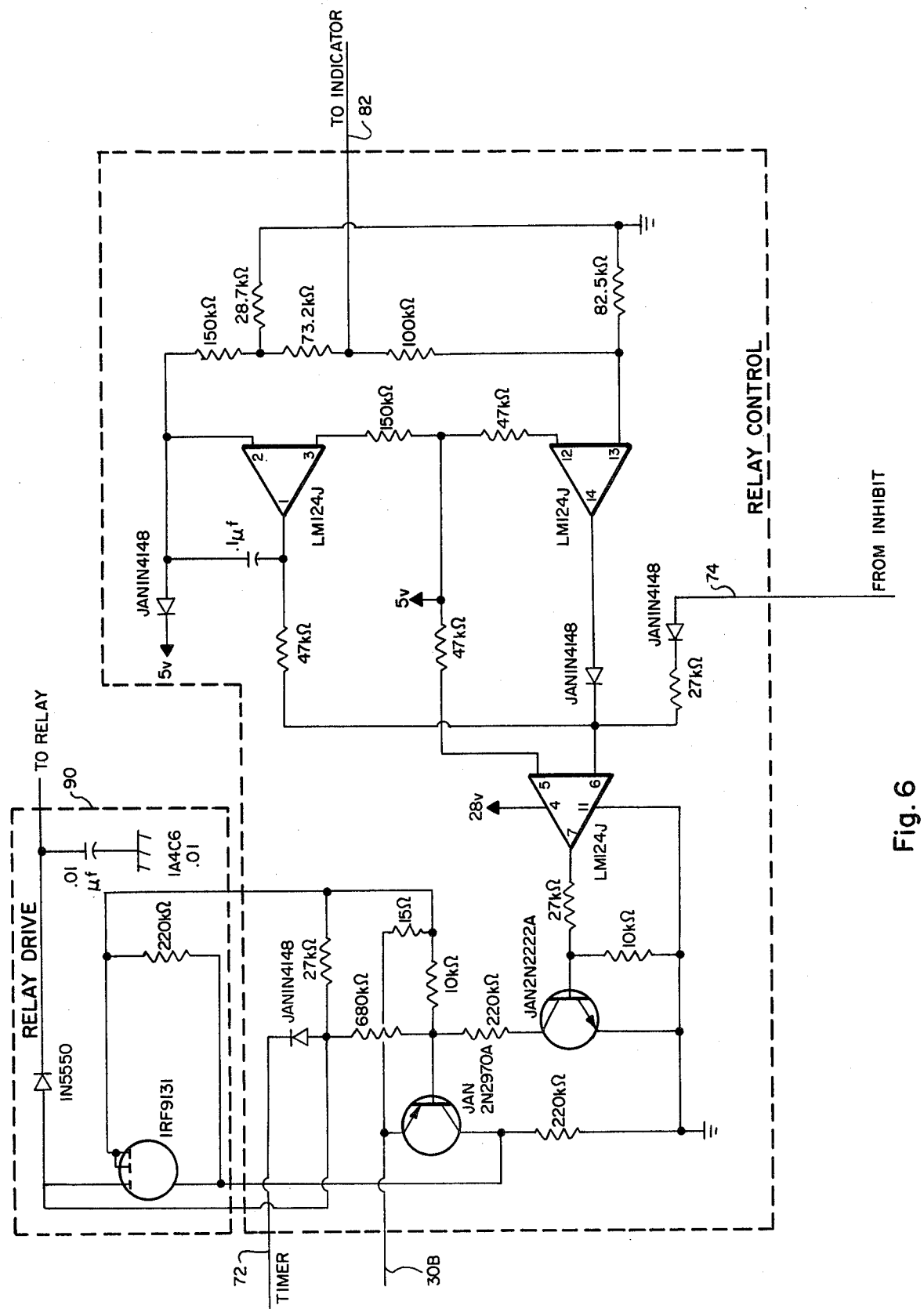
FIG. 6 illustrates practical relay control and drive circuitry associated with a battery charger of the invention.

FIG. 6 illustrates in detail practical circuitry for the relay drive and relay control circuits. As noted above, a variety of different relays may be necessary to interface the battery charger with the platform and with other batteries and battery chargers of a battery system.

It should be noted that the charger of the instant invention is particularly suitable for use with aircraft and in particular high performance aircraft which are capable of high speeds (MACH 1 plus) and high altitudes (40,000 feet plus). The charger of the instant invention is lightweight, durable, reliable and allows for battery bus voltage variances in normal operation from about 25 volts to about 35 volts. This in turn allows for less constraints on the platform generator system and quicker service charging in the main mode.

It should also be noted that the charger of the instant invention can be readily adapted to supply a variety of different charging modes including trickle charge.

It should be noted that the illustrated embodiment has also been described with respect to a 20 cell nickle cadmium battery. Those skilled in the art will recognize that the principles of the invention herein described are applicable for a wide variety of batteries. Accordingly, it is to be understood that the embodiments herein described are merely illustrative of the application of the principles of the invention. Reference herein to details of the illustrated embodiment is not intended to limit the scope of the claims which themselves recite those features regarded as essential to the invention.

I claim:

1. A battery charger comprising:
   first connector means for removable conductive connection to an external source of variable voltage direct current power;
   second connector means for removable conductive connection to a chargeable battery;
   sensing means positioned and connected to sense selected variable parameters of said battery; and
   a power circuit conductively connected to said first connector means to receive power therefrom and conductively connected to said second connector means to supply a multi-mode charging current to said battery, said power circuit including:
   boost means conductively connected to said first connector means to receive said external power therefrom and to said second connector means to receive a signal reflective of battery voltage to boost the voltage of the received external power to a level no lower than a preselected level above battery voltage when received voltage is below said preselected levels,
   current-mode regulating means conductively connected to said sensing means to receive signals reflective of selected variable parameters of said battery to sense the state of charge of said battery to supply current and mode regulating signals,
   a buck regulator conductively connected to receive the output of the boost means and to said current-mode regulating means to receive current and mode regulating signals to supply a multi-mode charging program having a constant charging current in each mode, and
   bias supply means conductively connected to said external power to receive power therefrom and to selected circuits of said power circuit to supply power thereto.

2. The battery charger of claim 1 further including a safety and control circuit conductively connected to said sensing means to receive signals reflective of selected variable parameters of said battery and to said power circuit to supply safety and control signals thereto to stop battery charger operation when the signals reflective of selected parameters are indicative of preselected conditions.

3. The battery charger of claim 1 wherein said boost means includes:
   a boost drive conductively connected to receive the signal reflective of battery voltage to supply and save signal;
   a boost regulator conductively connected to receive said external power and to said boost drive to receive said drive signal to boost and maintain the voltage of the received external power.

4. The battery charger of claim 3 wherein the sensing means includes:
   a battery temperature sensor positioned to sense battery temperature and connected to supply a signal reflective thereof to said current and mode regulating means;
   means conductively connected to sense battery voltage and cell balance and supply signals reflective thereof to said current and mode regulating means.

5. The battery charger of claim 4 wherein said current and mode regulating means includes:
   a mode control circuit connected to the sensing means to receive the battery temperature signal and battery voltage signal to supply a mode signal related to the state of charge of said battery;
   a current control circuit connected to receive the mode signal from the mode control circuit and to the buck regulator to supply current control signals thereto so that the buck regulator supplied constant charging current in each mode.

6. The battery charger of claim 5 wherein said buck regulator has MOSFET transistors connected to form a current regulating loop.

7. In combination with a vehicle of the type having a high energy battery and having a variable source of direct current power associated with said vehicle, a battery charger comprising:
   first connector means for removable conductive connection to an external source of variable voltage direct current power;
   second connector means for removable conductive connection to a chargeable battery;
   sensing means positioned and connected to sense selected variable parameters of said battery;
   a power circuit conductively connected to said first connector means to receive power therefrom and conductively connected to said second connector means to supply a multi-mode charging current to said battery, said power circuit including:
   boost means conductively connected to said first connector means to receive said external power therefrom and to said second connector means to receive a signal reflective of battery voltage to boost the voltage of the received external power to a level no lower than a preselected level above battery voltage when received voltage is below said preselected levels,
   current-mode regulating means conductively connected to said sensing means to receive signals reflective of selected variable parameters of said battery to sense the state of charge of said battery to supply current and mode regulating signals,
   a buck regulator conductively connected to receive the output of the boost means and to said current-mode regulating means to receive current and mode regulating signals to supply a multi-mode charging program having a constant charging current in each mode, and
   bias supply means conductively connected to said external power to receive power therefrom and to selected circuits of said power circuit to supply power thereto.

8. The combination of claim 7 wherein said battery charger further includes a safety and control circuit conductively connected to said sensing means to receive signals reflective of selected variable parameters of said battery and to said power circuit to supply safety and control signals thereto to stop battery charger operation when the signals reflective of selected parameters are indicative of preselected conditions.

9. The combination of claim 7 wherein said boost means includes:
   a boost drive conductively connected to receive the signal reflective of battery voltage to supply and save signal;
   a boost regulator conductively connected to receive said external power and to said boost drive to receive said drive signal to boost and maintain the voltage of the received external power, and wherein the sensing means includes:

a battery temperature sensor positioned to sense battery temperature and connected to supply a signal reflective thereof to said current and mode regulating means, means conductively connected to sense battery voltage and cell balance and supply signals reflective thereof to said current and mode regulating means, and wherein said current and mode regulating means includes:

a mode control circuit connected to the sensing means to receive the battery temperature signal and battery voltage signal to supply a mode signal related to the state of charge of said battery, and a current control circuit connected to receive the mode signal from the mode control circuit and to the buck regulator to supply current control signals thereto so that the buck regulator supplied constant charging current in each mode.

10. In a battery charger for charging a battery in accordance with a multi-mode program related to the state of charge of the battery where variable external direct current power is supplied to the charger, a buck regulator circuit having biased MOSFET transistors connected to form a current regulating loop and connected to supply a constant charging current as the charger output in each charging mode.

* * * * *